US012494311B2

(12) United States Patent
Halagur et al.

(10) Patent No.: US 12,494,311 B2
(45) Date of Patent: Dec. 9, 2025

(54) ACTUATOR DRIVER

(71) Applicant: QUALCOMM Incorporated, San Diego, CA (US)

(72) Inventors: Shivaprakash Halagur, Singapore (SG); Joseph Dale Rutkowski, Chandler, AZ (US); Liangguo Shen, San Diego, CA (US); Nathaniel Jay T. Salazar, San Diego, CA (US); Milind Sawant, Morgan Hill, CA (US)

(73) Assignee: QUALCOMM Incorporated, San Diego, CA (US)

(*) Notice: Subject to any disclaimer, the term of this patent is extended or adjusted under 35 U.S.C. 154(b) by 136 days.

(21) Appl. No.: 18/442,549

(22) Filed: Feb. 15, 2024

(65) Prior Publication Data

US 2025/0266197 A1 Aug. 21, 2025

(51) Int. Cl.
*H01F 7/06* (2006.01)
*H01F 7/08* (2006.01)

(52) U.S. Cl.
CPC ............... *H01F 7/064* (2013.01); *H01F 7/08* (2013.01)

(58) Field of Classification Search
CPC .................................. H01F 7/064; H01F 7/08
See application file for complete search history.

(56) References Cited

U.S. PATENT DOCUMENTS

2013/0127531 A1* 5/2013 Lesso ...................... H03F 3/217 330/251

* cited by examiner

*Primary Examiner* — Daniel Cavallari
(74) *Attorney, Agent, or Firm* — QUALCOMM Incorporated

(57) ABSTRACT

In an aspect, an actuator driver includes a first digital adder configured to output an adjusted control signal based on combining an input control signal and a filtered difference signal, a digital pulse width modulation (PWM) generator configured to convert the adjusted control signal to one or more PWM signals, and an H-bridge amplifier configured to output one or more driving signals based on the one or more PWM signals. The actuator driver further includes a feedback signal generator configured to generate a feedback signal based on the one or more driving signals, a second digital adder configured to output a difference signal based on subtracting the feedback signal from the adjusted control signal, and a loop filter configured to generate the filtered difference signal based on the difference signal.

20 Claims, 11 Drawing Sheets

ACTUATOR DRIVER

TECHNICAL FIELD

The present disclosure generally relates to an actuator driver, and more particularly to an actuator driver that includes a feedback signal generator and a loop filter to reduce total harmonic distortion.

BACKGROUND

Haptic feedback refers to the use of technology that stimulates the senses of touch and motion, e.g., the study or use of tactile sensations and the sense of touch as a method of interacting with computers and electronic devices. In some examples, the haptic feedback may be produced by a haptic actuator, such as an eccentric rotating mass (ERM) vibration motor or a linear resonant actuator (LRA). An electronic device may include a haptic actuator and an actuator driver configured to drive the haptic actuator. In some examples, the actuator driver may include an H-bridge amplifier configured to generate one or more driving signals for driving the haptic actuator based on a control signal. In some examples, the H-bridge amplifier may be configured to switch the polarities of a power source applied to the haptic actuator.

In some examples, compared to the control signal, the switching operations of the H-bridge amplifier may introduce additional noise signals to the driving signals, such as the noise components that correspond to harmonic of a fundamental frequency of the control signal. In some examples, the distortion in the driving signals caused by the harmonic noise components of the fundamental frequency of the control signal may be measurable as a total harmonic distortion (THD) of the driving signals. In some aspects, the THD may depend on factors such as an average duty cycle of the driving signals and/or a slew rate of the driving signals. In some examples, the distortion in the driving signals caused by the harmonic noise components of the fundamental frequency of the control signal may impact the driving accuracy, which may vary from 5% to 10% across the output (e.g., voltage) range.

Accordingly, there is a need for an actuator driver that can reduce the THD of the driving signals to address the above-noted issues.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, an actuator driver includes a first digital adder configured to output an adjusted control signal based on combining an input control signal and a filtered difference signal; a digital pulse width modulation (PWM) generator configured to convert the adjusted control signal to one or more PWM signals; an H-bridge amplifier configured to output one or more driving signals based on the one or more PWM signals; a feedback signal generator configured to generate a feedback signal based on the one or more driving signals; a second digital adder configured to output a difference signal based on subtracting the feedback signal from the adjusted control signal; and a loop filter configured to generate the filtered difference signal based on the difference signal.

In an aspect, a method of operating an actuator driver includes outputting, by a first digital adder of the actuator driver, an adjusted control signal based on combining an input control signal and a filtered difference signal; converting, by a digital pulse width modulation (PWM) generator of the actuator driver, the adjusted control signal to one or more PWM signals; outputting, by an H-bridge amplifier of the actuator driver, one or more driving signals based on the one or more PWM signals; generating, by a feedback signal generator of the actuator driver, a feedback signal based on the one or more driving signals; outputting, by a second digital adder of the actuator driver, a difference signal based on subtracting the feedback signal from the adjusted control signal; and generating, by a loop filter of the actuator driver, the filtered difference signal based on the difference signal.

In an aspect, an electronic device includes a controller; a haptic actuator; and an actuator driver configured to drive the haptic actuator, the haptic actuator comprising: a first digital adder configured to output an adjusted control signal based on combining an input control signal from a controller and a filtered difference signal; a digital pulse width modulation (PWM) generator configured to convert the adjusted control signal to one or more PWM signals; an H-bridge amplifier configured to output one or more driving signals to drive the haptic actuator based on the one or more PWM signals; a feedback signal generator configured to generate a feedback signal based on the one or more driving signals; a second digital adder configured to output a difference signal based on subtracting the feedback signal from the adjusted control signal; and a loop filter configured to generate the filtered difference signal based on the difference signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
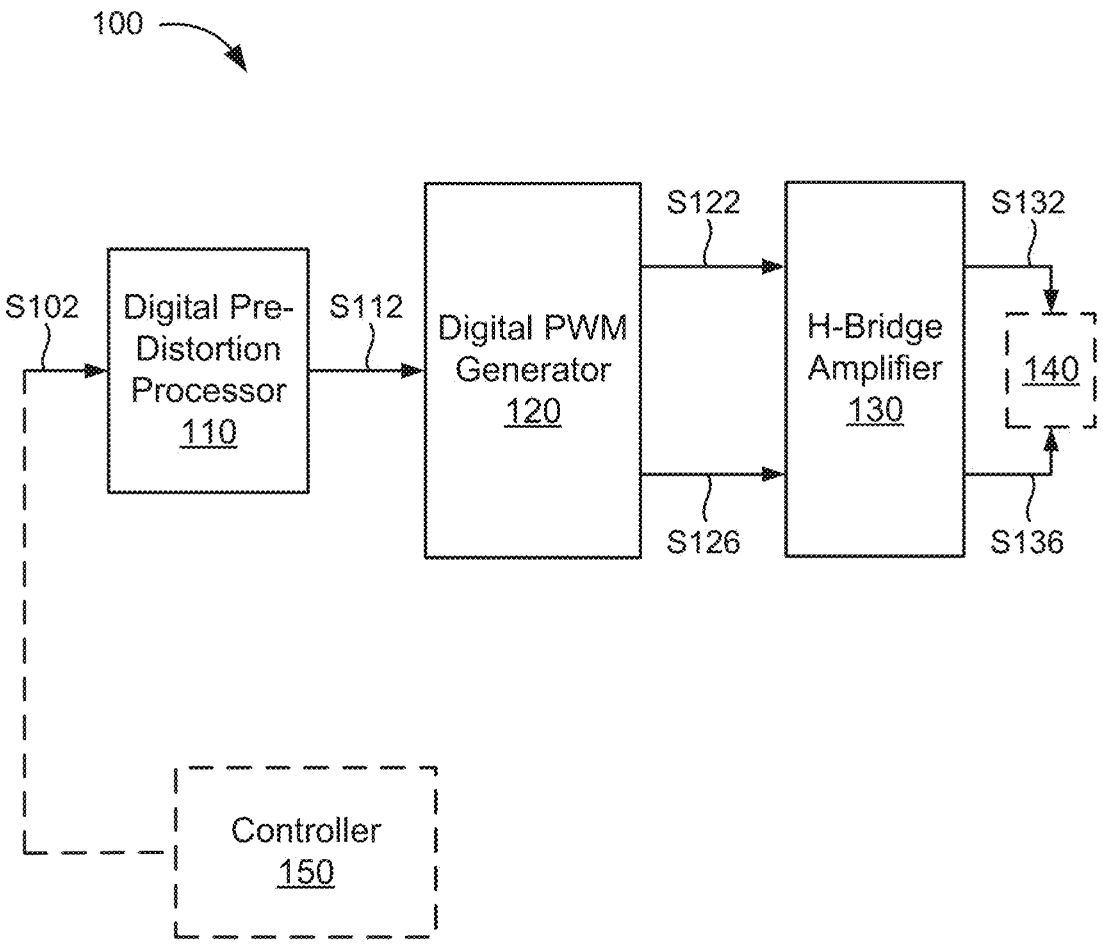
FIG. 1 illustrates a first actuator driver example, according to aspects of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

In certain described example implementations, instances are identified where various component structures and portions of operations can be taken from known, conventional techniques, and then arranged in accordance with one or more aspects. In such instances, internal details of the known, conventional component structures and/or portions of operations may be omitted to help avoid potential obfuscation of the concepts illustrated in the illustrative aspects disclosed herein.

The terminology used herein is for the purpose of describing particular aspects only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Additionally, terms such as approximately, generally, and the like indicate that the examples provided are not intended to be limited to the precise numerical values or geometric shapes and include normal variations due to, manufacturing tolerances and variations, material variations, and other design considerations.

Various aspects relate generally to an actuator driver for driving a haptic actuator. Some aspects more specifically relate to an actuator driver that includes a feedback signal generator and a loop filter configured to reduce total harmonic distortion of the driving signals.

Particular aspects of the subject matter described in this disclosure can be implemented to realize one or more of the following potential advantages. In some examples, by sensing the voltage levels of the driving signals by a feedback signal generator and generating a filtered difference signal by a loop filter, the input control signal may be adjusted to become an adjusted control signal. Based on the feedback control mechanism and the adjusted control signal, the harmonic noises in the driving signals may be suppressed.

FIG. 1 illustrates a first actuator driver example 100, according to aspects of the disclosure. As shown in FIG. 1, the first actuator driver example 100 includes a digital pre-distortion processor 110, a digital pulse width modulation (PWM) generator 120, and an H-bridge amplifier 130. In some aspects, the digital pre-distortion processor 110 may be configured to generate a compensated control signal S112 based on an input control signal S102. The digital PWM generator 120 may be configured to convert the compensated control signal S112 to one or more PWM signals (e.g., signals S122 and S126). The H-bridge amplifier 130 may be configured to output one or more driving signals (e.g., signals S132 and S136) based on the one or more PWM signals (e.g., signals S122 and S126). In some aspects, the one or more driving signals (e.g., signals S132 and S136) may be used to drive a haptic actuator 140 (which may be outside the actuator driver 100). In some aspects, the digital pre-distortion processor 110 may receive the input control signal S102 from a controller 150 (which may be outside the actuator driver 100). In some aspects, the first actuator driver example 100, the haptic actuator 140, and the controller 150 may be included in an electronic device, such as a smartphone, a mobile terminal, or the like.

In some aspects, the signals S102 and S112 may be in a digital domain; and the signals S122 and S126 may be non-inverted and inverted PWM representations of the signal S112. In some aspects, the signals S132 and S136 may apply a power source to the haptic actuator 140 with the polarities of the power source switched based on the PWM signals S122 and S126.

In some aspects, the digital pre-distortion processor 110 may generate the compensated control signal S112 by scaling the input control signal S102 based on a scaling factor applicable to a total range of the signal S102. In some aspects, the digital pre-distortion processor 110 may store the scaling factor. In some aspects, the digital pre-distortion processor 110 may store a set of candidate scaling factors and may select the scaling factor therefrom based on an instruction from the controller 150.

In some aspects, the digital pre-distortion processor 110 may generate the compensated control signal S112 by scaling the input control signal S102 based on a piecewise-linear scaling function. In some aspects, the digital pre-distortion processor 110 may store the piecewise-linear scaling function. In some aspects, the digital pre-distortion processor 110 may store a set of candidate piecewise-linear scaling functions and may select the piecewise-linear scaling function therefrom based on an instruction from the controller 150.

In some aspects, the compensated control signal S112 may adding a pre-distortion component to the input control signal S102 such that the linearity between the driving signals S132 and S136 and the input control signal S102 may be improved (i.e., for non-linearity correction). However, the digital pre-distortion processor 110 does not appear to noticeably improve the THD of the driving signals S132 and S136. In some aspects, the hormonic distortion may even cause reduction of the level of the fundamental frequency component.

Figure 2:
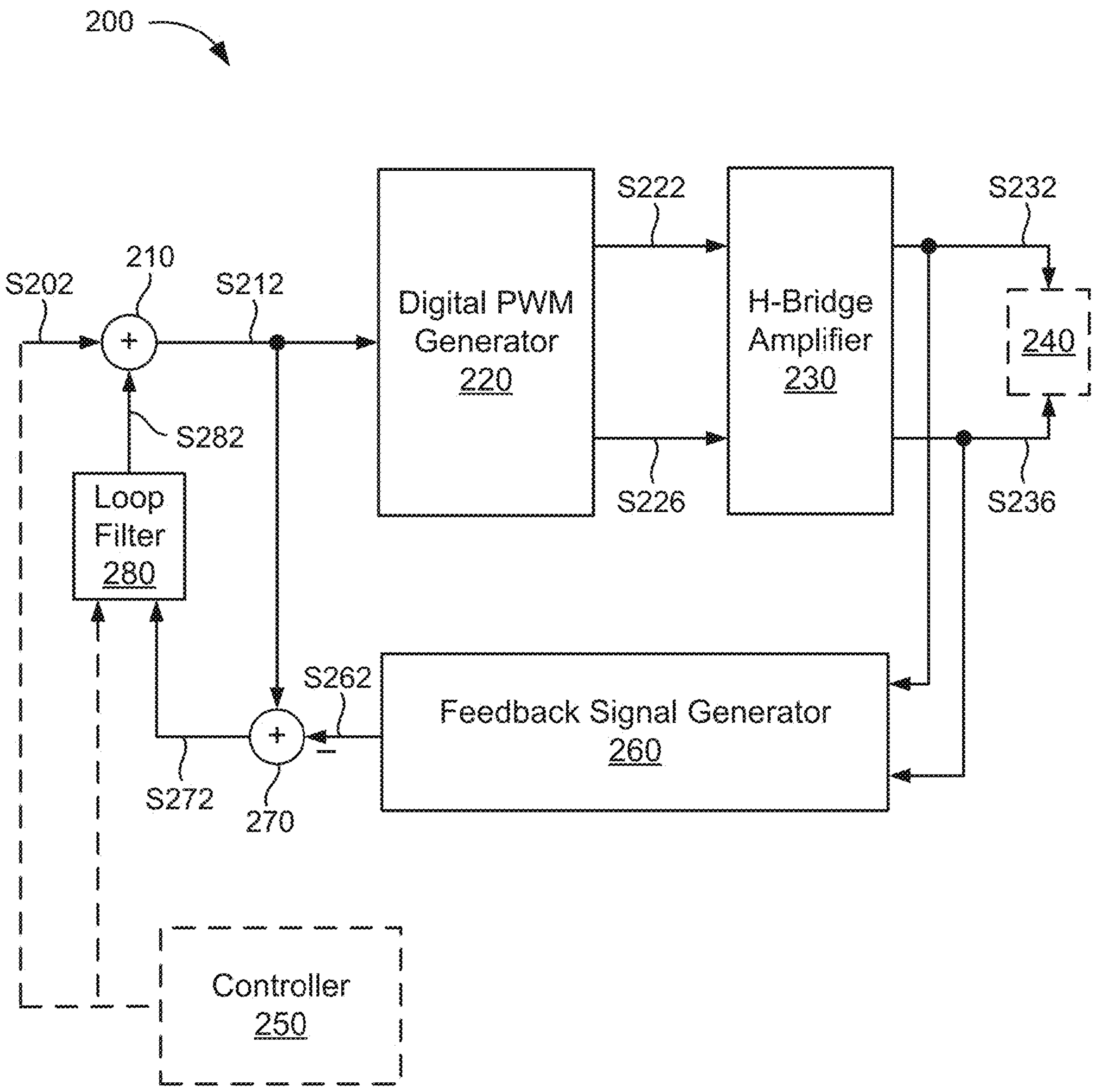
FIG. 2 illustrates a second actuator driver example, according to aspects of the disclosure.

FIG. 2 illustrates a second actuator driver example 200, according to aspects of the disclosure. As shown in FIG. 2, the second actuator driver example 200 may include a first digital adder 210, a digital PWM generator 220, and an H-bridge amplifier 230. In some aspects, the first digital adder 210 may be configured to output an adjusted control signal S212 based on combining an input control signal S202 and a filtered difference signal S282. In some aspects, the input control signal S202 may have a fundamental frequency ranging from 100 Hz to 500 Hz.

In some aspects, the digital PWM generator 220 may be configured to convert the adjusted control signal S212 to one or more PWM signals (e.g., signals S222 and S226). In some aspects, the H-bridge amplifier 230 may be configured to output one or more driving signals (e.g., signals S232 and S236) based on the one or more PWM signals (e.g., signals S222 and S226). In some aspects, the one or more driving signals (e.g., signals S232 and S236) may be used to drive a haptic actuator 240 (which may be outside the actuator driver 200). In some aspects, the second actuator driver example 200, the haptic actuator 240, and the controller 250 may be included in an electronic device, such as a smartphone, a mobile terminal, or the like.

In some aspects, the signals S202 and S212 may be in a digital domain; and the signals S222 and S226 may be non-inverted and inverted PWM representations of the signal S212. In some aspects, the signals S232 and S236 may apply a power source to the haptic actuator 240 with the polarities of the power source switched based on the PWM signals S222 and S226. In some aspects, the digital PWM generator 220, the H-bridge amplifier 230, the haptic actuator 240, and/or the controller 250 in FIG. 2 may correspond to the digital PWM generator 120, the H-bridge amplifier 130, the haptic actuator 140, and/or the controller 150 in FIG. 1.

As shown in FIG. 2, the second actuator driver example 200 may further include a feedback signal generator 260, a second digital adder 270, and a loop filter 280. In some aspects, the feedback signal generator 260 may be configured to generate a feedback signal S262 based on the one or more driving signals (e.g., signals S232 and S236). In some aspects, the second digital adder 270 may be configured to output a difference signal S272 based on subtracting the feedback signal S262 from the adjusted control signal S212. In some aspects, the loop filter 280 may be configured to generate the filtered difference signal S282 based on the difference signal S272.

In some aspects, the error portion corresponding to the harmonic components in the one or more driving signals (e.g., signals S232 and S236) with respect to the input control signal S202 may be obtained based on sensing the voltage levels of the one or more driving signals (e.g., signals S232 and S236) by the feedback signal generator 260, and then extracted by the second digital adder 270 (e.g., as the difference signal S272), and then filtered by the loop filter 280 (e.g., as the filtered difference signal S282). The control signal provided to the digital PWM generator 220 may be adjusted based on the filtered difference signal S282. As a result, the THD of the driving signals S232 and S236 may be improved based on at least the feedback mechanism formed by the feedback signal generator 260, the feedback signal generator 260, and the loop filter 280.

Figure 3:
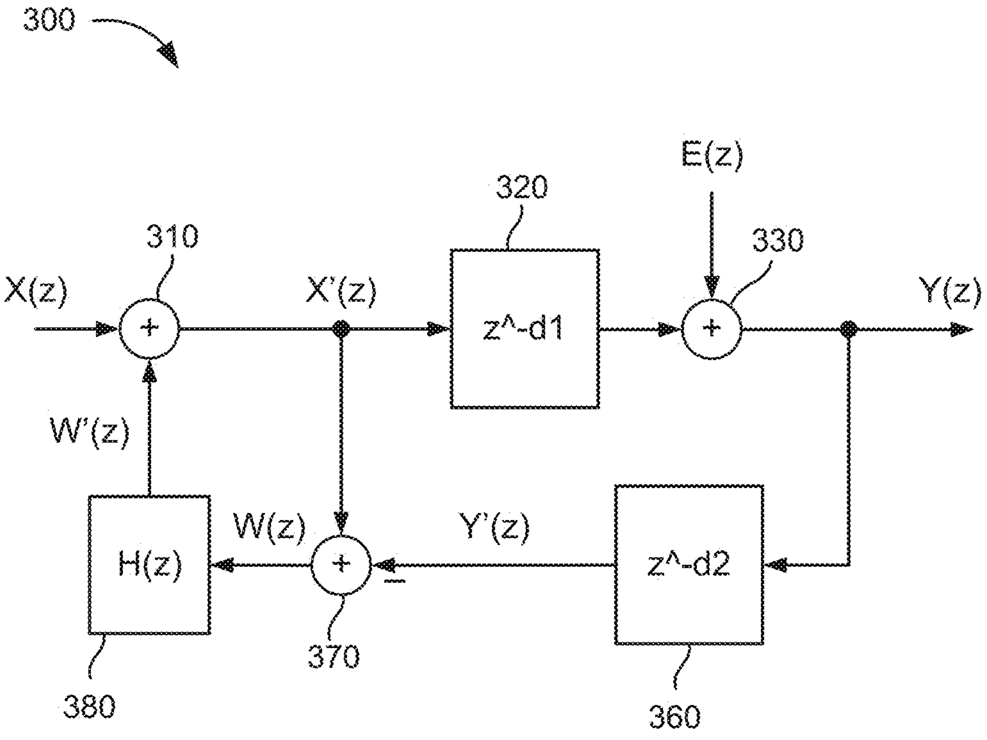
FIG. 3 is a block diagram illustrating a z-domain model of an actuator driver, according to aspects of the disclosure.

FIG. 3 is a block diagram illustrating a z-domain model 300 of an actuator driver, such as the second actuator driver example 200 in FIG. 2, according to aspects of the disclosure. As shown in FIG. 3, the z-domain model 300 may include an addition operator 310 corresponding to the first digital adder 210 of the actuator driver 200; a delay 320 corresponding to the delay effect (with a delay d1) in the z-domain of the digital PWM generator 220 of the actuator driver 200; and another addition operator 330 and an error signal E(z) representing the effect of an error signal with a z-domain expression of E(z) being introduced by the H-bridge amplifier 230 in the z-domain. Also, as shown in FIG. 3, the z-domain model 300 may further include a delay 360 corresponding to the delay effect (with a delay d2) in the z-domain of the feedback signal generator 260 of the actuator driver 200; an addition operator 370 corresponding to the second digital adder 270 of the actuator driver 200; and a transfer function H(z) (block 380) representing the transfer function of the loop filter 280.

Moreover, as shown in FIG. 3, signal X(z) may correspond to the input control signal S202; signal X'(z) may correspond to the adjusted control signal S212; signal Y(z) may correspond to the one or more driving signals S232 and S236; signal Y'(z) may correspond to the feedback signal S262; signal W(z) may correspond to the difference signal S272; and signal W'(z) may correspond to the filtered difference signal S282. In some aspects, according to FIG. 3, the actuator driver 200, based on at least the loop filter 280, the digital PWM generator 220, and the feedback signal generator 260, may be configured to implement shaping of the error signal E(z) based on a noise transfer function (NTF) between the error signal E(z) and the one or more driving signals Y(z), and the NTF may have, in the z-transform domain, an expression of $$\mathrm{NTF}(Y(z)/E(z))=(1-H(z))/(-H(z)+H(z)\cdot z\hat{\ }-(d1+d2)).$$

Figure 4A:
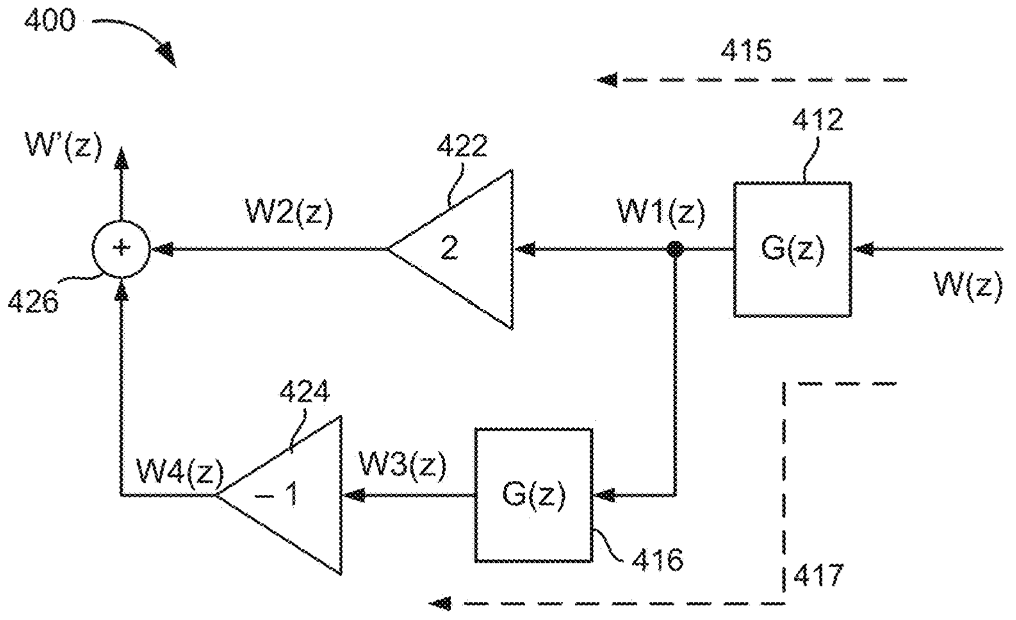
FIG. 4A is a block diagram illustrating a z-domain model of a loop filter, according to aspects of the disclosure.

FIG. 4A is a block diagram illustrating a z-domain model 400 of a loop filter, such as the loop filter 280 in FIG. 2 and corresponding to the transfer function H(z) (block 380 in FIG. 3) representing the transfer function of the loop filter 280, according to aspects of the disclosure. In some aspects, the signals W(z) and W'(z) in FIG. 4A may correspond to the signals W(z) and W'(z) in FIG. 3 and the signals S262 and S272 in FIG. 2. In some aspects, the z-domain model 400 shows a non-limiting implementation example of a loop filter.

As shown in FIG. 4A, in some aspects, the loop filter 280 (as represented by the z-domain model 400) may be based on a combination of multiple component filters (as represented by blocks 412 and 416 in FIG. 4A each having a z-domain transfer function of G(z). In some aspects, the loop filter may be based on a combination of a first signal path 415 based on a first component filter (e.g., block 412) of the multiple component filters, and a second signal path 417 based on cascading the first component filter (e.g., block 412) and a second component filter (e.g., block 416) of the multiple component filters. In some aspects, the transfer function G(z) may correspond to a first-order filter, and the transfer function H(z) may correspond to a second-order noise-shaping filter. In some other examples, the transfer function H(z) may correspond to a first-order noise-shaping filter.

As shown in FIG. 4A, the z-domain model 400 may include a gain stage 422, a gain stage 424, and an addition operator 426. The component filter (as represented by block 412) may receive the signal W(z) and output a signal W1(*z*) based on the transfer function G(z). The gain stage 422 may apply a gain (e.g., 2) to the signal W1(*z*) and output a signal W2(*z*). In addition, the component filter (as represented by block 416) may receive the signal W1(*z*) and output a signal W3(*z*) based on the transfer function G(z). The gain stage 424 may apply a gain (e.g., −1) to the signal W3(*z*) and output a signal W4(z). Finally, the addition operator 426 may generate the signal W'(z) based on combining the signal W2(z) and the signal W4(z).

Figure 4B:
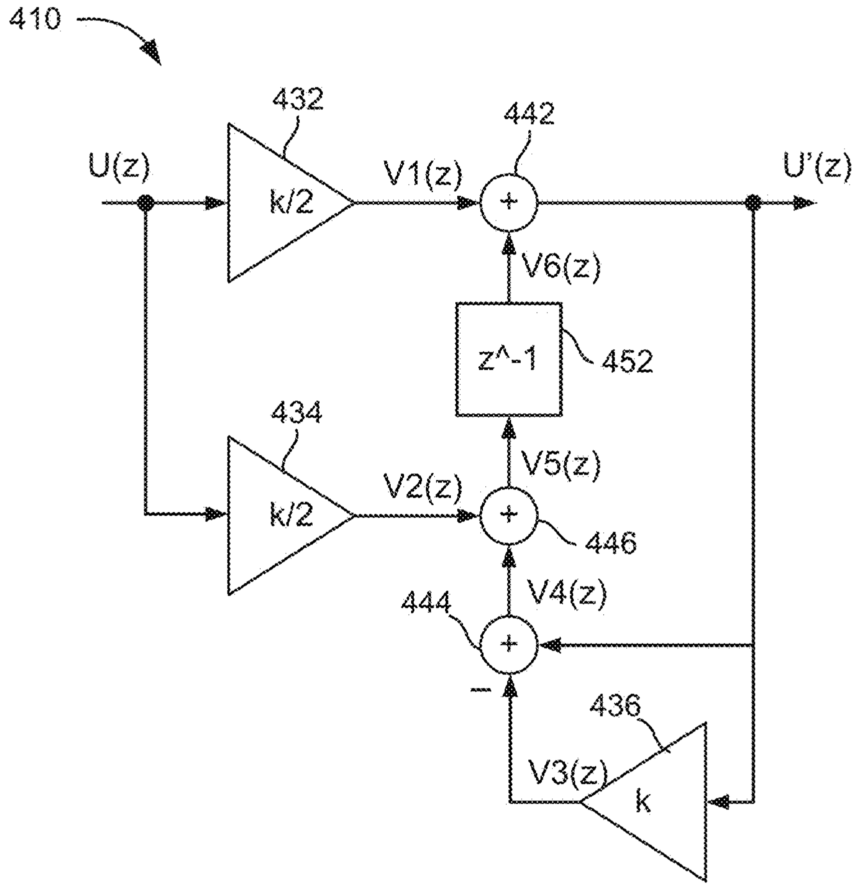
FIG. 4B is a block diagram illustrating a z-domain model of a component filter usable in a loop filter, according to aspects of the disclosure.

FIG. 4B is a block diagram illustrating a z-domain model 410 of a component filter usable in a loop filter, such as a component filter corresponding to the transfer function G(z) (block 412 or block 416 in FIG. 4A), according to aspects of the disclosure. In some aspects, the signals U(z) and U'(z) in FIG. 4B correspond to the input signal and the output signal of the component filter. In the case of block 412, the signals U(z) and U'(z) may correspond to signals W(z) and W1(z). In the case of block 416, the signals U(z) and U'(z) may correspond to signals W1(z) and W3(z). In some aspects, the z-domain model 410 shows a non-limiting implementation example of a component filter usable in a loop filter.

As shown in FIG. 4B, the z-domain model 410 (implemented by a component filter) may include gain stages 432, 434, and 436; addition operators 442, 444, and 446, and a delay 452 (with a delay of 1 in this example). As shown in FIG. 4B, the gain stage 432 may apply a gain (e.g., k/2) to the signal U(z) and output a signal V1(z); and the gain stage 434 may apply a gain (e.g., k/2) to the signal U(z) and output a signal V2(z). As shown in FIG. 4B, the addition operator 442 may generate the signal U'(z) based on combining the signal V1(z) and a signal V6(z).

As shown in FIG. 4B, the gain stage 436 may apply a gain (e.g., k) to the signal U'(z) and output a signal V3(z). The addition operator 442 may generate a signal V4(z) based on subtracting the signal V3(z) from the signal U'(z). The addition operator 446 may generate the signal V5(z) based on combining the signal V2(z) and the signal V4(z). Also, the delay 452 may impose a delay (e.g., 1 in this example) to the signal V5(z) to output the signal V6(z).

In some aspects, a bandwidth of the loop filter (e.g., represented by the z-domain model 400) may be adjustable based on a setting provided by a controller (e.g., the controller 250 in FIG. 2) outside the actuator driver 200. In some aspects, a gain value of a transfer function of the loop filter (e.g., k/2 or k) may be programmable based on the setting provided by the controller for adjusting the bandwidth of the loop filter.

In some examples, when the sampling rate of the signals in the loop filter (e.g., represented by the z-domain model 400) is 150 kHz, the k having a value of 0.25, 0.125, 0.0625, and 0.03125 may correspond to a bandwidth of the loop filter at 6.8 kHz, 3.4 kHz, 1.7 kHz, and 0.9 kHz, respectively. In some aspects, compared with the first actuator driver example 100 in FIG. 1, the second actuator driver example 200 in FIG. 2 implemented based on FIGS. 3-4B may further suppress the odd harmonic noises by at least 15 dB (power). In some aspects, the reduced hormonic distortion may ease the reduction of the level of the fundamental frequency component.

Figure 5:
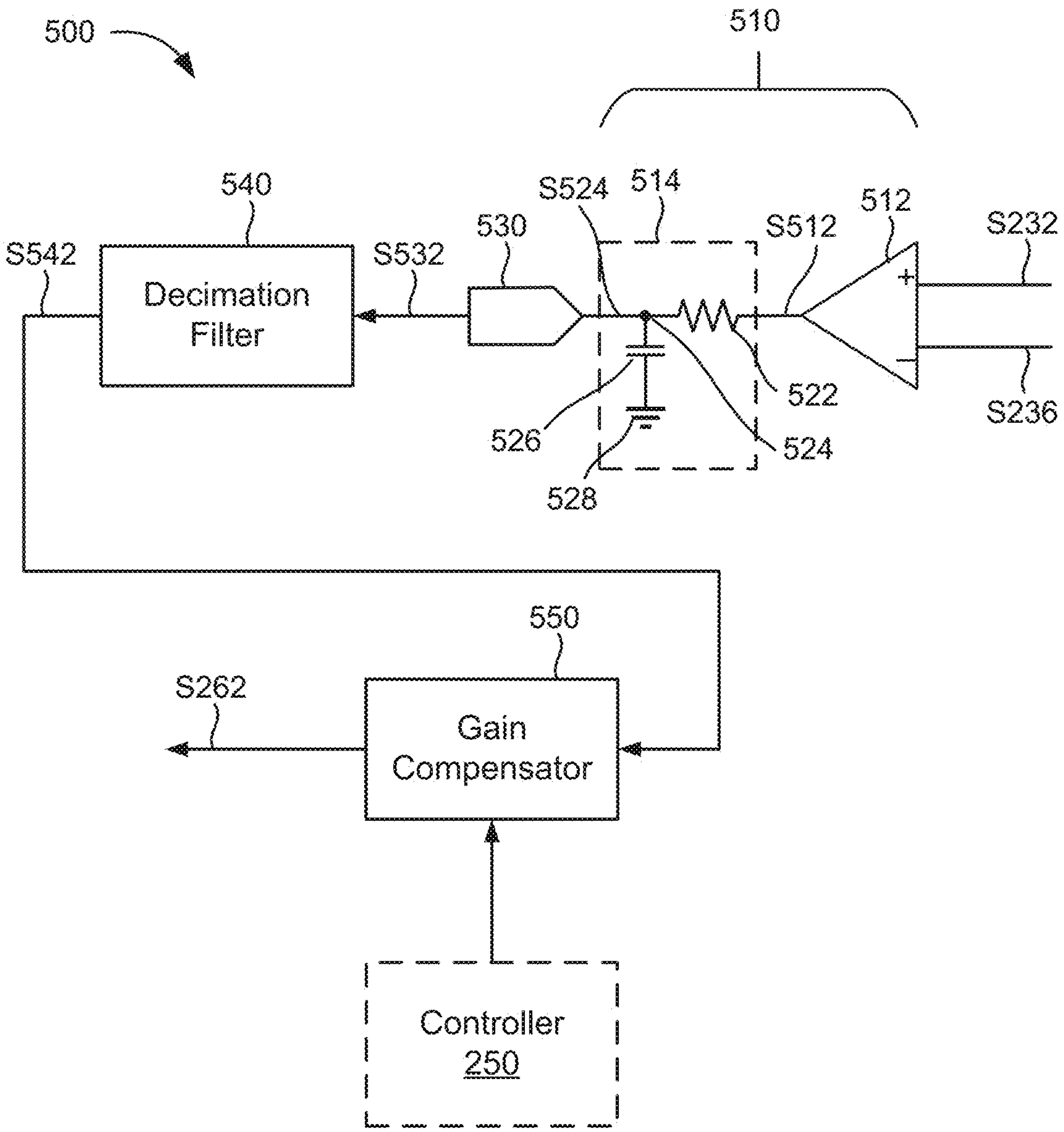
FIG. 5 illustrates a feedback signal generator example, according to aspects of the disclosure.

FIG. 5 illustrates a feedback signal generator example 500, according to aspects of the disclosure. In some aspects, the feedback signal generator example 500 may be a non-limiting example of the feedback signal generator 260 in FIG. 2. In some aspects, components in FIG. 5 that are the same or similar to those in FIG. 2 are given the same reference numbers, and detailed description thereof may be simplified or omitted.

As shown in FIG. 5, the feedback signal generator example 500 may include a voltage sensing circuit 510, an analog-to-digital converter 530, a decimation filter 540, and a gain compensator 550. In some aspects, the voltage sensing circuit may be configured to generate a sensed voltage signal S524 based on the one or more driving signals (e.g., the driving signals S232 and S236). In some aspects, the analog-to-digital converter 530 may be configured to generate a sensed digital signal S532 based on the sensed voltage signal S524. In some aspects, the analog-to-digital converter 530 may be an oversampling sigma-delta analog-to-digital converter. In some aspects, the decimation filter 540 may be configured to generate a down-sampled digital signal S542 based on the sensed digital signal S532. In some aspects, the decimation filter 540 may be an order-3 cascaded integrator-comb (CIC) filter.

In some aspects, the gain compensator 550 may be configured to generate the feedback signal S262 by scaling the down-sampled digital signal S542. In some aspects, the loop filter (e.g., the loop filter 280) may be configured to operate based on a first sampling rate, and the analog-to-digital converter 530 may be configured to operate based on a second sampling rate that is at least eight (8) times the first sampling rate. In some aspects, the gain compensator 550 may be controlled by the controller 250 in order to compensate for the gain introduced by the voltage sensing circuit 510, the analog-to-digital converter 530, and/or the decimation filter 540. In some aspects, the controller 250 may control the gain compensator 550 considering any process variation of the feedback gain and systematic offsets that may affect the feedback signal S262.

In some aspects, the one or more driving signals includes two driving signals S232 and S236. In some aspects, the voltage sensing circuit 510 may include a feedback differential amplifier 512 and an anti-aliasing filter 514. In some aspects, the feedback differential amplifier 512 may be configured to output an amplified signal S512 based on the two driving signals S232 and S236. In some aspects, the anti-aliasing filter 514 may be configured to generate the sensed voltage S524 signal by filtering the amplified signal S512. In some aspects, the anti-aliasing filter 514 may include a resistive device 522 coupled between an output terminal of the feedback differential amplifier 512 and a node 524; and a capacitive device 526 coupled between the node 524 and a ground reference node 528. In some aspects, the sensed voltage S524 may correspond to a voltage signal at the node 524.

Figure 6:
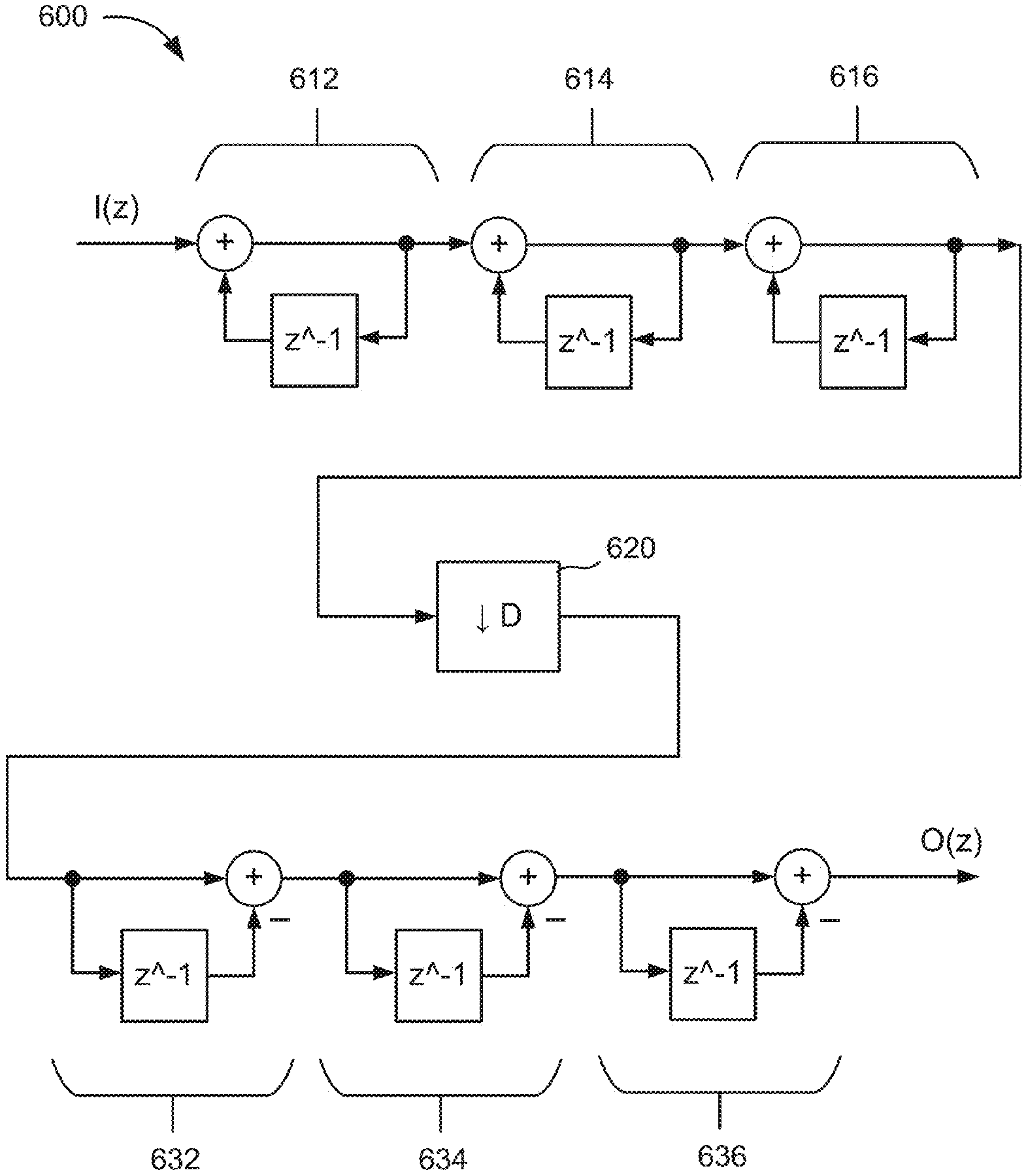
FIG. 6 is a block diagram illustrating a z-domain model of a decimation filter, according to aspects of the disclosure.

FIG. 6 is a block diagram illustrating a z-domain model 600 of a decimation filter, such as the decimation filter 540 in FIG. 5, according to aspects of the disclosure. In some aspects, the signals I(z) and O(z) in FIG. 5 may correspond to the z-domain representation of the signals S532 and S542 in FIG. 5. In some aspects, the z-domain model 600 shows a non-limiting implementation example of a decimation filter.

In some aspects, the z-domain model 600 shows that the decimation filter may be an order-3 CIC filter. As shown in FIG. 6, the decimation filter (represented by the z-domain model 600) may be configured to implement three cascaded integrator stages 612, 614, and 616, followed by a down-sampling block 620 (with a ratio D), and then followed by three cascaded comb stages 632, 634, and 636. In some aspects, the decimation filter (represented by the z-domain model 600) may be configured to implement a transfer function of [(1−z^−D)/(1−z^−1)]^3.

Figure 7:
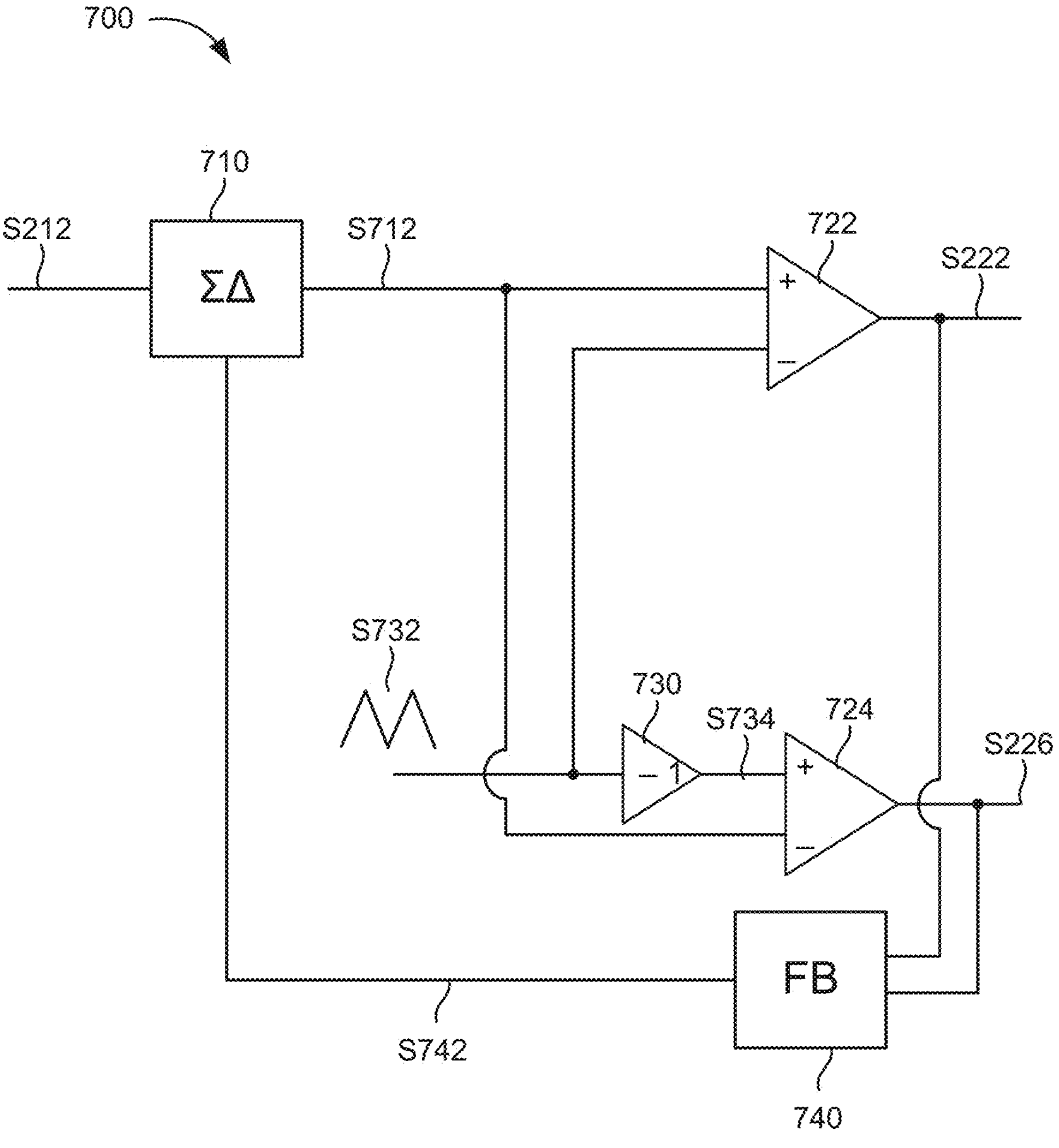
FIG. 7 illustrates a digital pulse width modulation (PWM) generator example, according to aspects of the disclosure.

FIG. 7 illustrates a digital PWM generator example 700, according to aspects of the disclosure. In some aspects, the digital PWM generator example 700 may be a non-limiting example of the digital PWM generator 220 in FIG. 2. In some aspects, components in FIG. 7 that are the same or similar to those in FIG. 2 are given the same reference numbers, and detailed description thereof may be simplified or omitted.

As shown in FIG. 7, the digital PWM generator example 700 may include a sigma-delta modulator 710, comparators 722 and 724, an inverter 730, and a feedback circuit (labeled as "FB") 740. In some aspects, the sigma-delta modulator 710 may receive the adjusted control signal S212 and convert the signal S212 into a modulated signal S712. In some aspects, the modulated signal S712 may be a higher sampling frequency with lower amplitude resolution version of the adjusted control signal S212. In some aspects, the modulated signal S712 may be provided to a positive terminal of the comparator 722 and a negative terminal of the comparator 724.

Moreover, the digital PWM generator example 700 may obtain a triangular wave signal S732 (either generated inside the digital PWM generator example 700 or received from outside the digital PWM generator example 700) and provide the triangular wave signal S732 to a negative terminal of the comparator 722. Also, the inverter 730 may receive the triangular wave signal S732 and generate an inverted triangular wave signal S734, which is further provided to a positive terminal of the comparator 724. In some aspects, the signals S732 and S734 may be digital signals, and the comparators 722 and 724 may compare various digital signals based on their digital values. In some aspects, the comparators 722 and 724 may generate the PWM signals S222 and S226 based on comparing the signal S712 against the triangular wave signal S732 and the inverted triangular wave signal S734. In some aspects, the feedback circuit 740 may generate a feedback signal S742 from the PWM signals S222 and S226 and provide the feedback signal S742 to the sigma-delta modulator 710.

Figure 8:
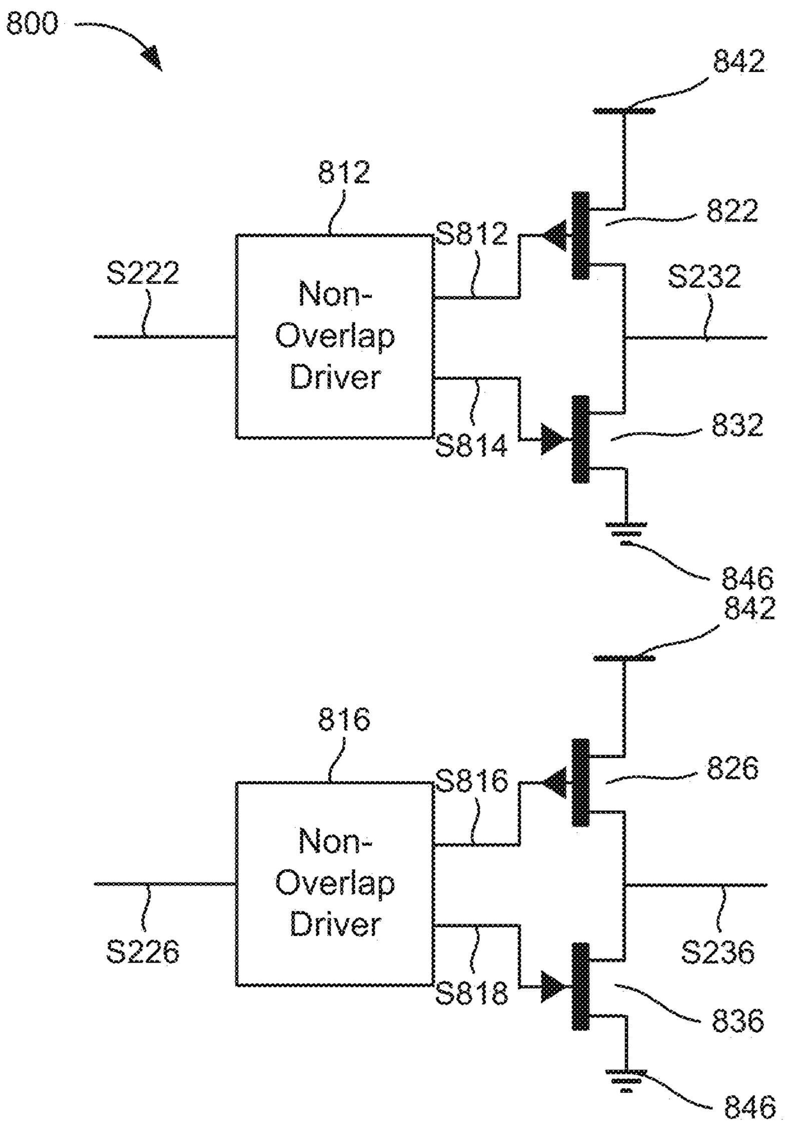
FIG. 8 illustrates an H-bridge amplifier example, according to aspects of the disclosure.

FIG. 8 illustrates an H-bridge amplifier example 800, according to aspects of the disclosure. In some aspects, the H-bridge amplifier example 800 may be a non-limiting example of the H-bridge amplifier 230 in FIG. 2. In some aspects, components in FIG. 8 that are the same or similar to those in FIG. 2 are given the same reference numbers, and detailed description thereof may be simplified or omitted.

As shown in FIG. 8, the H-bridge amplifier example 800 may include non-overlap drivers 812 and 816, p-channel transistors 822 and 826, and n-channel transistors 832 and 836. The drains of the p-channel transistor 822 and the n-channel transistor 832 may be coupled together to output the driving signal S232. The drains of the p-channel transistor 826 and the n-channel transistor 836 may be coupled together to output the driving signal S236. The sources of the p-channel transistors 822 and 826 may be coupled to a supply voltage 842, and the sources of the n-channel transistors 832 and 836 may be coupled to a ground reference 846. In this example, the transistors 822, 826, 832, and 836 are depicted as junction field effect transistors (JFETs). In some other examples, the transistors 822, 826, 832, and 836 may be metal-oxide-semiconductor field effect transistors (MOSFETs), bipolar junction transistors (BJTs), or the like.

As shown in FIG. 8, the non-overlap driver 812 may receive the PWM signal S222 and generate a control signal S812 for controlling the gate of the p-channel transistor 822 and a control signal S814 for controlling the gate of the n-channel transistor 832. The non-overlap driver 812 may ensure that the transistors 822 and 832 may not be turned on at the same time in order to avoid a short circuit between the supply voltage 842 and the ground reference 846. Also, the non-overlap driver 816 may receive the PWM signal S226 and generate a control signal S816 for controlling the gate of the p-channel transistor 826 and a control signal S818 for controlling the gate of the n-channel transistor 836. The non-overlap driver 816 may ensure that the transistors 826 and 836 may not be turned on at the same time in order to avoid a short circuit between the supply voltage 842 and the ground reference 846.

Figure 9:
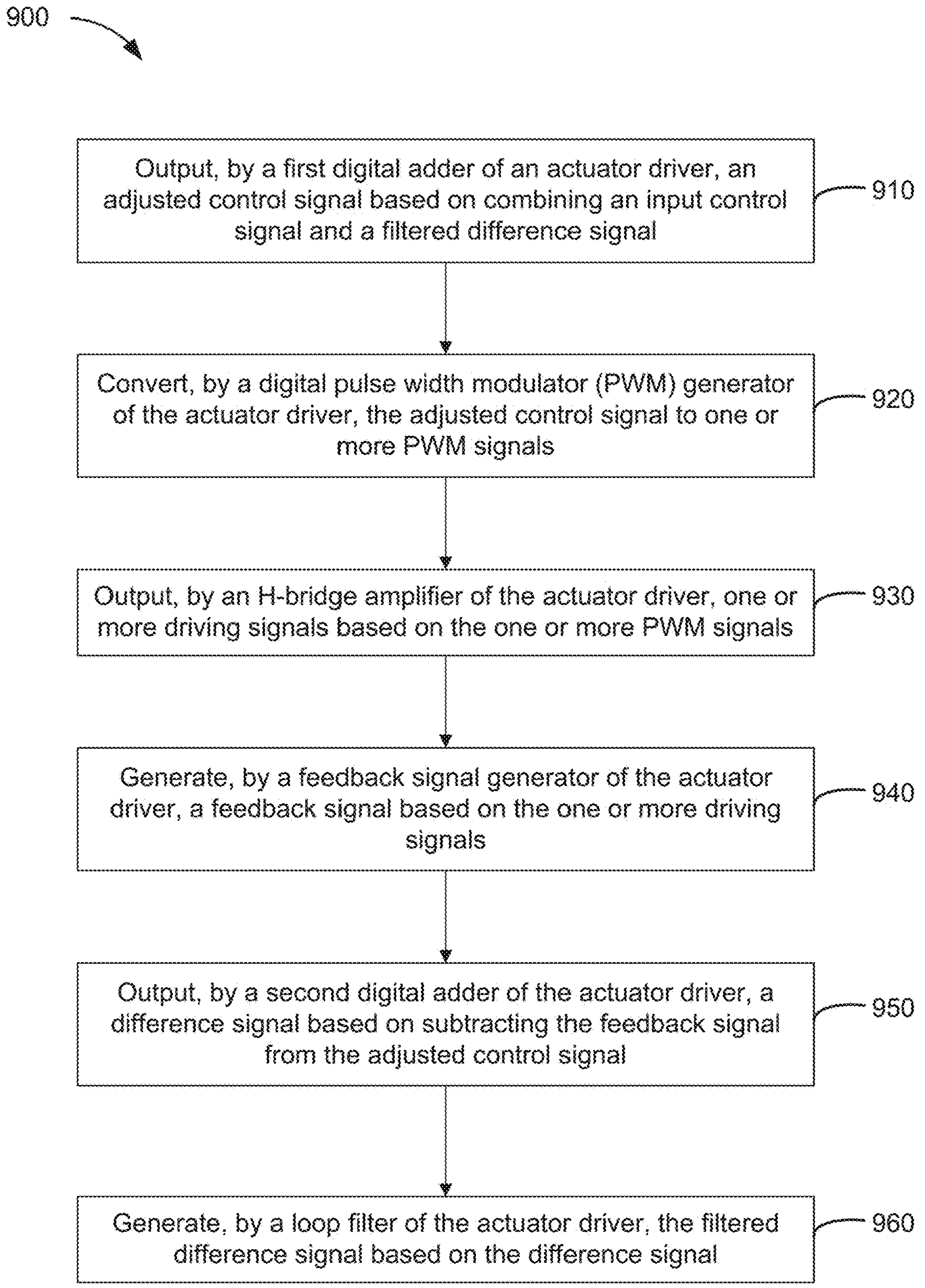
FIG. 9 illustrates a method of operating an actuator driver, according to aspects of the disclosure.

FIG. 9 illustrates a method 900 of operating an actuator driver, according to aspects of the disclosure. In some aspects, the actuator driver in method 900 may correspond to an actuator implemented based on the examples illustrated in FIGS. 2-8.

At operation 910, a first digital adder (e.g., the digital adder 210) of an actuator driver (e.g., the actuator driver 200) may output an adjusted control signal (e.g., the signal S212) based on combining an input control signal (e.g., the signal S202) and a filtered difference signal (e.g., the signal S282). In some aspects, the input control signal may have a fundamental frequency ranging from 100 Hz to 500 Hz.

At operation 920, a digital PWM generator (e.g., the digital PWM generator 220) of the actuator driver may convert the adjusted control signal (e.g., the signal S212) to one or more PWM signals (e.g., the signals S222 and S226).

At operation 930, an H-bridge amplifier (e.g., the H-bridge amplifier 230) of the actuator driver may output one or more driving signals (e.g., the signals S232 and S236) based on the one or more PWM signals (e.g., the signals S222 and S226).

At operation 940, a feedback signal generator (e.g., the feedback signal generator 260) of the actuator driver may generate a feedback signal (e.g., the signal S262) based on the one or more driving signals (e.g., the signals S232 and S236). In some aspects, the generation of the feedback signal may include generating, by a voltage sensing circuit of the feedback signal generator, a sensed voltage signal based on the one or more driving signals; generating, by an analog-to-digital converter of the feedback signal generator, a sensed digital signal based on the sensed voltage signal; generating, by a decimation filter of the feedback signal generator, a down-sampled digital signal based on the sensed digital signal; and generating, by a gain compensator of the feedback signal generator, the feedback signal by scaling the down-sampled digital signal.

In some aspects, the loop filter is configured to operate based on a first sampling rate. In some aspects, the analog-to-digital converter is configured to operate based on a second sampling rate that is at least eight (8) times the first sampling rate.

In some aspects, the one or more driving signals includes two driving signals (e.g., signals S232 and S236). In some aspects, the generation of the sensed voltage signal may include outputting, by a differential amplifier of the voltage sensing circuit, an amplified signal based on the two driving signals; and generating, by an anti-aliasing filter of the voltage sensing circuit filtering the amplified signal, the sensed voltage signal. In some aspects, the analog-to-digital converter may be an oversampling sigma-delta analog-to-digital converter. In some aspects, the decimation filter may be an order-3 CIC filter.

At operation 950, a second digital adder (e.g., the digital adder 270) of the actuator driver may output a difference signal (e.g., the signal S272) based on subtracting the feedback signal (e.g., the signal S262) from the adjusted control signal (e.g., the signal S212).

At operation 960, a loop filter (e.g., the loop filter 280) of the actuator driver may generate the filtered difference signal (e.g., the signal S282) based on the difference signal (e.g., the signal S272).

In some aspects, as further illustrated in FIG. 3, the digital PWM generator may be configured to have a first delay d1, the feedback signal generator may be configured to have a second delay d2, and the actuator driver, based on at least the loop filter, the digital PWM generator, and the feedback signal generator, may be configured to implement shaping of an error signal based on an NTF that has, in a z-transform domain, an expression of NTF(Y(z)/E(z))=(1−H(z))/(−H (z)+H(z)·z^−(d1+d2)). Here, Y(z) represents the one or more driving signals, Y(z) represents the one or more driving signals introduced to the one or more driving signals by the H-bridge amplifier, and H(z) represents a transfer function of the loop filter.

In some aspects, as further illustrated in FIGS. 4A and 4B, the loop filter may be based on a combination of multiple component filters. In some aspects, the loop filter may be based on a combination of a first signal path based on a first component filter of the multiple component filters, and a second signal path based on cascading the first component filter and a second component filter of the multiple component filters. In some aspects, the method 900 may further include adjusting a bandwidth of the loop filter based on a setting provided by a controller (e.g., the controller 250) outside the actuator driver. In some aspects, a gain value of a transfer function of the loop filter may be programmable based on the setting provided by the controller for adjusting the bandwidth of the loop filter. In some aspects, the input control signal may be provided by the controller.

As will be appreciated, a technical advantage of the method 900 corresponds to providing a feedback control mechanism for reducing the harmonic noises in the driving signals. In some examples, by sensing the voltage levels of the driving signals by the feedback signal generator and generating a filtered difference signal by the loop filter, the input control signal may be adjusted to become an adjusted control signal. Accordingly, based on the feedback control and the adjusted control signal, the harmonic noises in the driving signals may be suppressed.

Figure 10:
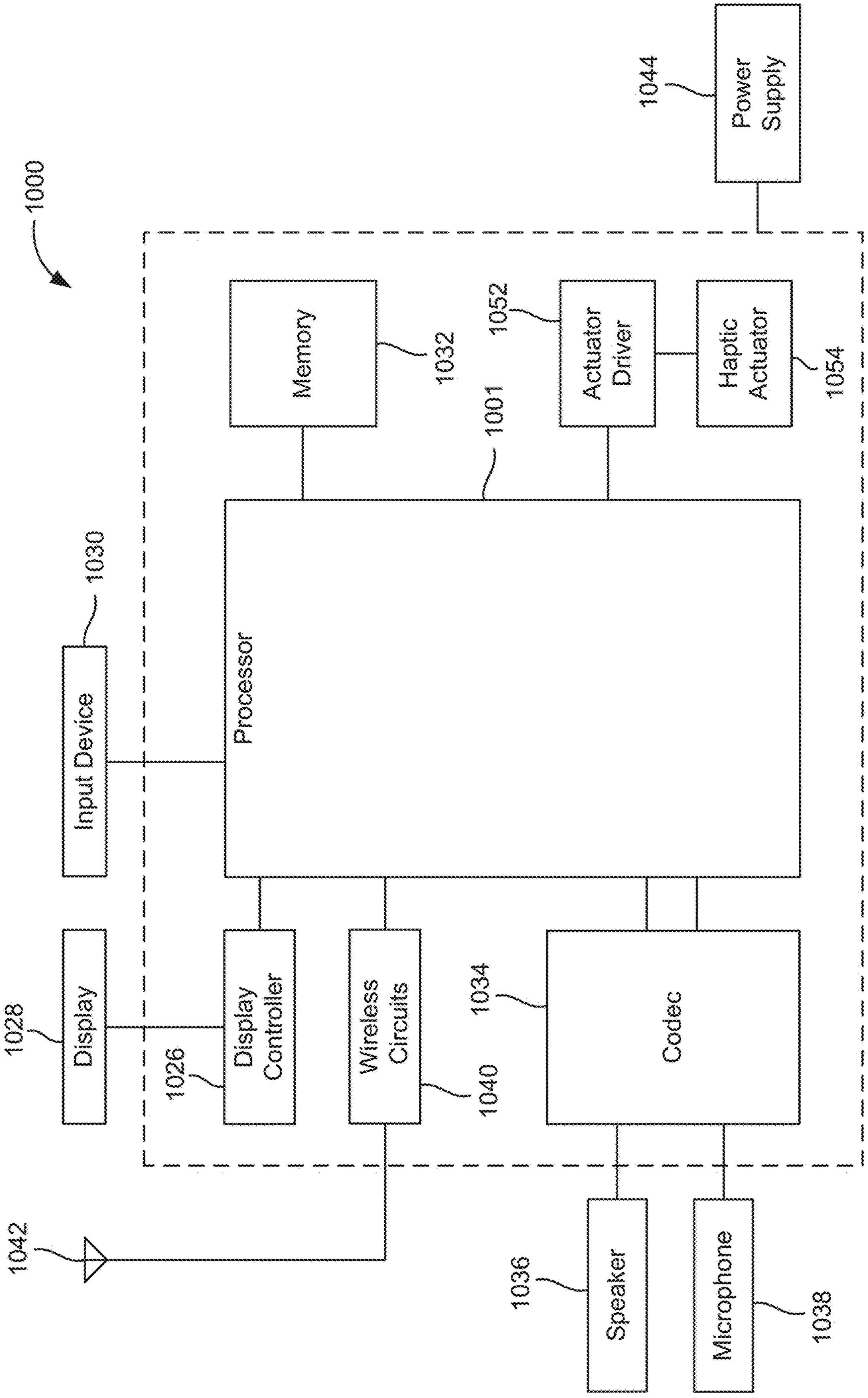
FIG. 10 illustrates a mobile device, according to aspects of the disclosure.

FIG. 10 illustrates a mobile device 1000, according to aspects of the disclosure. In some aspects, the mobile device 1000 may be implemented by including one or more haptic actuators and corresponding one or more actuator drivers as disclosed herein.

In some aspects, mobile device 1000 may be configured as a wireless communication device. As shown, mobile device 1000 includes processor 1001. Processor 1001 may be communicatively coupled to memory 1032 over a link, which may be a die-to-die or chip-to-chip link. Mobile device 1000 also includes display 1028 and display controller 1026, with display controller 1026 coupled to processor 1001 and to display 1028. The mobile device 1000 may include input device 1030 (e.g., physical, or virtual keyboard), power supply 1044 (e.g., battery), speaker 1036, microphone 1038, and wireless antenna 1042. In some aspects, the power supply 1044 may directly or indirectly provide the supply voltage for operating some or all of the components of the mobile device 1000.

In some aspects, FIG. 10 may include coder/decoder (CODEC) 1034 (e.g., an audio and/or voice CODEC) coupled to processor 1001; speaker 1036 and microphone 1038 coupled to CODEC 1034; and wireless circuits 1040 (which may include a modem, RF circuitry, filters, etc.) coupled to wireless antenna 1042 and to processor 1001.

In some aspects, the mobile device 1000 may further include an actuator driver 1052 (corresponding to any actuator driver described above) that is coupled to the processor 1001, and a haptic actuator 1054 (corresponding to any haptic actuator described above) to be driven by the actuator driver 1052.

It should be noted that although FIG. 10 depicts a mobile device 1000, similar architecture may be used to implement an apparatus including a set top box, a music player, a video player, an entertainment unit, a navigation device, a personal digital assistant (PDA), a fixed location data unit, a computer, a laptop, a tablet, a communications device, a mobile phone, or other similar devices.

Figure 11:
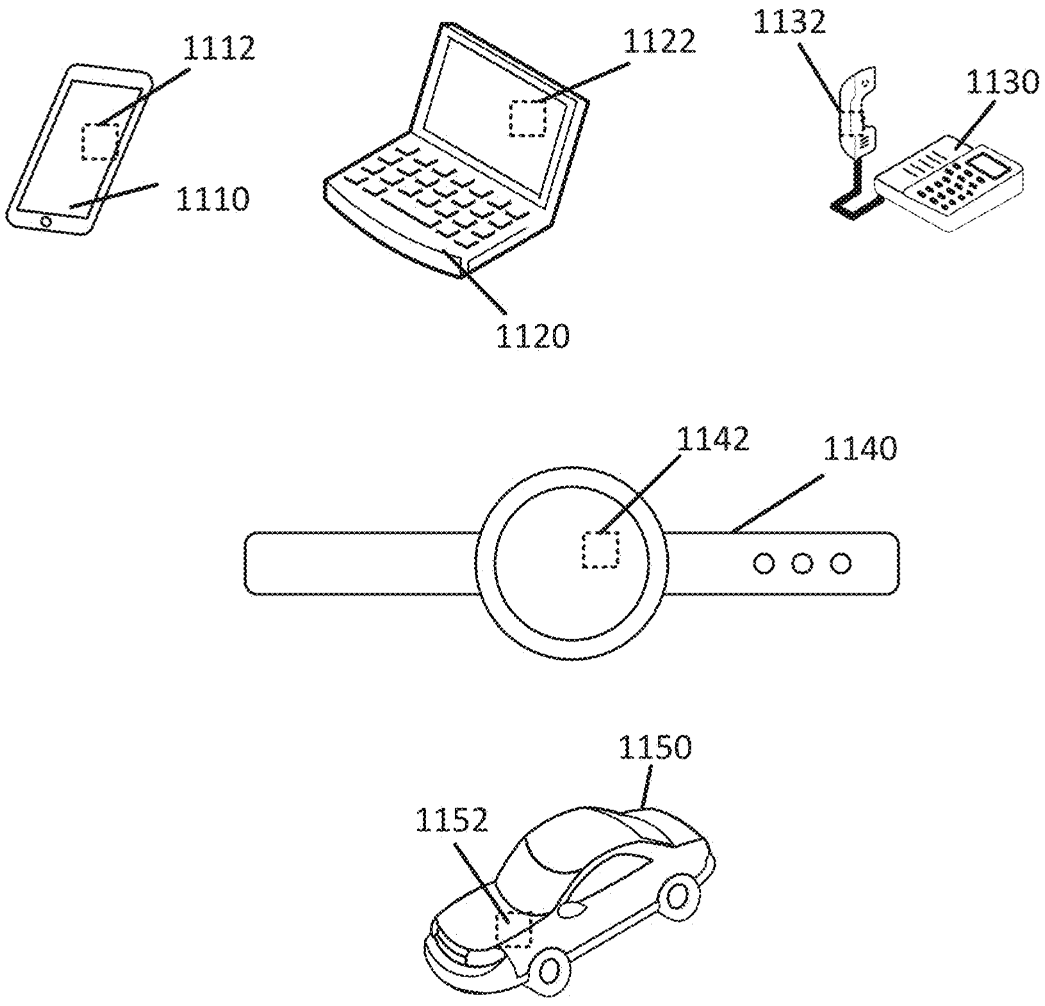
FIG. 11 illustrates various electronic devices that may incorporate haptic components, according to aspects of the disclosure.

FIG. 11 illustrates various electronic devices that may incorporate haptic components, according to aspects of the disclosure. For example, a mobile phone device 1110, a laptop computer device 1120, a fixed location terminal device 1130, a wearable device 1140, or an electronic device onboard an automotive vehicle 1150 may respectively include haptic components 1112, 1122, 1132, 1142, and 1152 (e.g., corresponding to a combination of a haptic actuator and an actuator driver, based on the examples described above with reference to FIGS. 2-11). The devices 1110, 1120, 1130, and 1140 and the vehicle 1150 illustrated in FIG. 11 are merely exemplary. Other apparatuses or devices that may feature the haptic components as described herein may include, but not limited to, a group of devices that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices (e.g., watches, glasses), Internet of things (IoT) devices, servers, routers, electronic devices implemented in automotive vehicles (e.g., autonomous vehicles), or any other device that stores or retrieves data or computer instructions, or any combination thereof.

It will be appreciated that various aspects disclosed herein can be described as functional equivalents to the structures, materials and/or devices described and/or recognized by those skilled in the art. For example, in one aspect, an apparatus may comprise a means for performing the various functionalities discussed above. It will be appreciated that the aforementioned aspects are merely provided as examples and the various aspects claimed are not limited to the specific references and/or illustrations cited as examples.

One or more of the components, processes, features, and/or functions illustrated in FIGS. 1-11 may be rearranged and/or combined into a single component, process, feature, or function or incorporated in several components, processes, or functions. Additional elements, components, processes, and/or functions may also be added without departing from the disclosure. In some implementations, FIGS. 1-11 and the corresponding description may be used to manufacture, create, provide, and/or produce integrated devices. In some implementations, a device may include a die, an integrated device, a die package, an IC, a device package, an IC package, a wafer, a semiconductor device, a system in package (SiP), a system on chip (SoC), a package on package (POP) device, and the like.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. An actuator driver, comprising: a first digital adder configured to output an adjusted control signal based on combining an input control signal and a filtered difference signal; a digital pulse width modulation (PWM) generator configured to convert the adjusted control signal to one or more PWM signals; an H-bridge amplifier configured to output one or more driving signals based on the one or more PWM signals; a feedback signal generator configured to generate a feedback signal based on the one or more driving signals; a second digital adder configured to output a difference signal based on subtracting the feedback signal from the adjusted control signal; and a loop filter configured to generate the filtered difference signal based on the difference signal.

Clause 2. The actuator driver of clause 1, wherein: the digital PWM generator is configured to have a first delay d1, the feedback signal generator is configured to have a second delay d2, and the actuator driver, based on at least the loop filter, the digital PWM generator, and the feedback signal generator, is configured to implement shaping of an error signal based on a noise transfer function (NTF) that has, in a z-transform domain, an expression of: NTF(Y(z)/E(z))=(1−H(z))/(−H(z)+H(z)·z^−(d1+d2)), wherein: Y(z) represents the one or more driving signals, E(z) represents the error signal introduced to the one or more driving signals by the H-bridge amplifier, and H(z) represents a transfer function of the loop filter.

Clause 3. The actuator driver of any of clauses 1 to 2, wherein: the loop filter is based on a combination of multiple component filters.

Clause 4. The actuator driver of clause 3, wherein the loop filter is based on a combination of: a first signal path based on a first component filter of the multiple component filters, and a second signal path based on cascading the first component filter and a second component filter of the multiple component filters.

Clause 5. The actuator driver of any of clauses 1 to 4, wherein: a bandwidth of the loop filter is adjustable based on a setting provided by a controller outside the actuator driver.

Clause 6. The actuator driver of clause 5, wherein: a gain value of a transfer function of the loop filter is programmable based on the setting provided by the controller for adjusting the bandwidth of the loop filter.

Clause 7. The actuator driver of any of clauses 5 to 6, wherein: the input control signal is provided by the controller.

Clause 8. The actuator driver of any of clauses 1 to 7, wherein the feedback signal generator comprises: a voltage sensing circuit configured to generate a sensed voltage signal based on the one or more driving signals; an analog-to-digital converter configured to generate a sensed digital signal based on the sensed voltage signal; a decimation filter configured to generate a down-sampled digital signal based on the sensed digital signal; and a gain compensator configured to generate the feedback signal by scaling the down-sampled digital signal.

Clause 9. The actuator driver of clause 8, wherein: the loop filter is configured to operate based on a first sampling rate; and the analog-to-digital converter is configured to operate based on a second sampling rate that is at least eight (8) times the first sampling rate.

Clause 10. The actuator driver of any of clauses 8 to 9, wherein: the one or more driving signals includes two driving signals, and the voltage sensing circuit comprises: a differential amplifier configured to output an amplified signal based on the two driving signals, and an anti-aliasing filter configured to generate the sensed voltage signal by filtering the amplified signal.

Clause 11. The actuator driver of any of clauses 8 to 10, wherein: the analog-to-digital converter is an oversampling sigma-delta analog-to-digital converter.

Clause 12. The actuator driver of clause 11, wherein: the decimation filter is an order-3 cascaded integrator-comb (CIC) filter.

Clause 13. The actuator driver of any of clauses 1 to 12, wherein: the input control signal has a fundamental frequency ranging from 100 Hz to 500 Hz.

Clause 14. A method of operating an actuator driver, comprising: outputting, by a first digital adder of the actuator driver, an adjusted control signal based on combining an input control signal and a filtered difference signal; converting, by a digital pulse width modulation (PWM) generator of the actuator driver, the adjusted control signal to one or more PWM signals; outputting, by an H-bridge amplifier of the actuator driver, one or more driving signals based on the one or more PWM signals; generating, by a feedback signal generator of the actuator driver, a feedback signal based on the one or more driving signals; outputting, by a second digital adder of the actuator driver, a difference signal based on subtracting the feedback signal from the adjusted control signal; and generating, by a loop filter of the actuator driver, the filtered difference signal based on the difference signal.

Clause 15. The method of clause 14, wherein: the digital PWM generator is configured to have a first delay d1, the feedback signal generator is configured to have a second delay d2, and the actuator driver, based on at least the loop filter, the digital PWM generator, and the feedback signal generator, is configured to implement shaping of an error signal based on a noise transfer function (NTF) that has, in a z-transform domain, an expression of: NTF(Y(z)/E(z))=(1−H(z))/(1−H(z)+H(z)·z^−(d1+d2)), wherein: Y(z) represents the one or more driving signals, E(z) represents the error signal introduced to the one or more driving signals by the H-bridge amplifier, and H(z) represents a transfer function of the loop filter.

Clause 16. The method of any of clauses 14 to 15, wherein: the loop filter is based on a combination of multiple component filters.

Clause 17. The method of clause 16, wherein the loop filter is based on a combination of: a first signal path based on a first component filter of the multiple component filters, and a second signal path based on cascading the first component filter and a second component filter of the multiple component filters.

Clause 18. The method of any of clauses 14 to 17, further comprising: adjusting a bandwidth of the loop filter based on a setting provided by a controller outside the actuator driver.

Clause 19. The method of clause 18, wherein: a gain value of a transfer function of the loop filter is programmable based on the setting provided by the controller for adjusting the bandwidth of the loop filter.

Clause 20. The method of any of clauses 18 to 19, wherein: the input control signal is provided by the controller.

Clause 21. The method of any of clauses 14 to 20, wherein the generating, by the feedback signal generator of the actuator driver, the feedback signal comprises: generating, by a voltage sensing circuit of the feedback signal generator, a sensed voltage signal based on the one or more driving signals; generating, by an analog-to-digital converter of the feedback signal generator, a sensed digital signal based on the sensed voltage signal; generating, by a decimation filter of the feedback signal generator, a down-sampled digital signal based on the sensed digital signal; and generating, by a gain compensator of the feedback signal generator, the feedback signal by scaling the down-sampled digital signal.

Clause 22. The method of clause 21, wherein: the loop filter is configured to operate based on a first sampling rate; and the analog-to-digital converter is configured to operate based on a second sampling rate that is at least eight (8) times the first sampling rate.

Clause 23. The method of any of clauses 21 to 22, wherein: the one or more driving signals includes two driving signals, and the generating, by the voltage sensing circuit of the feedback signal generator, the sensed voltage signal comprises: outputting, by a differential amplifier of the voltage sensing circuit, an amplified signal based on the two driving signals, and generating, by an anti-aliasing filter of the voltage sensing circuit filtering the amplified signal, the sensed voltage signal.

Clause 24. The method of any of clauses 21 to 23, wherein: the analog-to-digital converter is an oversampling sigma-delta analog-to-digital converter.

Clause 25. The method of clause 24, wherein: the decimation filter is an order-3 cascaded integrator-comb (CIC) filter.

Clause 26. The method of any of clauses 14 to 25, wherein: the input control signal has a fundamental frequency ranging from 100 Hz to 500 Hz.

Clause 27. An electronic device, comprising: a controller; a haptic actuator; and an actuator driver configured to drive the haptic actuator, the haptic actuator comprising: a first digital adder configured to output an adjusted control signal based on combining an input control signal from a controller and a filtered difference signal; a digital pulse width modulation (PWM) generator configured to convert the adjusted control signal to one or more PWM signals; an H-bridge amplifier configured to output one or more driving signals to drive the haptic actuator based on the one or more PWM signals; a feedback signal generator configured to generate a feedback signal based on the one or more driving signals; a second digital adder configured to output a difference signal based on subtracting the feedback signal from the adjusted control signal; and a loop filter configured to generate the filtered difference signal based on the difference signal.

Clause 28. The electronic device of clause 27, wherein: the digital PWM generator is configured to have a first delay d1, the feedback signal generator is configured to have a second delay d2, and the actuator driver, based on at least the loop filter, the digital PWM generator, and the feedback signal generator, is configured to implement shaping of an error signal based on a noise transfer function (NTF) that has, in a z-transform domain, an expression of: $NTF(Y(z)/E(z))=(1-H(z))/(1-H(z)+H(z)\cdot z\hat{}-(d1+d2))$, wherein: Y(z) represents the one or more driving signals, E(z) represents the error signal introduced to the one or more driving signals by the H-bridge amplifier, and H(z) represents a transfer function of the loop filter.

Clause 29. The electronic device of any of clauses 27 to 28, wherein: the loop filter is based on a combination of multiple component filters.

Clause 30. The electronic device of clause 29, wherein the loop filter is based on a combination of: a first signal path based on a first component filter of the multiple component filters, and a second signal path based on cascading the first component filter and a second component filter of the multiple component filters.

Clause 31. The electronic device of any of clauses 27 to 30, wherein: a bandwidth of the loop filter is adjustable based on a setting provided by a controller outside the actuator driver.

Clause 32. The electronic device of clause 31, wherein: a gain value of a transfer function of the loop filter is programmable based on the setting provided by the controller for adjusting the bandwidth of the loop filter.

Clause 33. The electronic device of any of clauses 31 to 32, wherein: the input control signal is provided by the controller.

Clause 34. The electronic device of any of clauses 27 to 33, wherein the feedback signal generator comprises: a voltage sensing circuit configured to generate a sensed voltage signal based on the one or more driving signals; an analog-to-digital converter configured to generate a sensed digital signal based on the sensed voltage signal; a decimation filter configured to generate a down-sampled digital signal based on the sensed digital signal; and a gain compensator configured to generate the feedback signal by scaling the down-sampled digital signal.

Clause 35. The electronic device of clause 34, wherein: the loop filter is configured to operate based on a first sampling rate; and the analog-to-digital converter is configured to operate based on a second sampling rate that is at least eight (8) times the first sampling rate.

Clause 36. The electronic device of any of clauses 34 to 35, wherein: the one or more driving signals includes two driving signals, and the voltage sensing circuit comprises: a differential amplifier configured to output an amplified signal based on the two driving signals, and an anti-aliasing filter configured to generate the sensed voltage signal by filtering the amplified signal.

Clause 37. The electronic device of any of clauses 34 to 36, wherein: the analog-to-digital converter is an oversampling sigma-delta analog-to-digital converter.

Clause 38. The electronic device of clause 37, wherein: the decimation filter is an order-3 cascaded integrator-comb (CIC) filter.

Clause 39. The electronic device of any of clauses 37 to 38, wherein: the input control signal has a fundamental frequency ranging from 100 Hz to 500 Hz.

Clause 40. The electronic device of any of clauses 37 to 39, wherein the electronic device comprises at least one of: a music player, a video player, an entertainment unit; a navigation device, a communications device, a mobile device, a mobile phone, a smartphone, a personal digital assistant, a fixed location terminal, a tablet computer, a computer, a wearable device, a laptop computer, a server, an internet of things (IoT) device, or a device in an automotive vehicle.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Furthermore, as used herein, the terms “set,” “group,” and the like are intended to include one or more of the stated elements. Also, as used herein, the terms “has,” “have,” “having,” “comprises,” “comprising,” “includes,” “including,” and the like does not preclude the presence of one or more additional elements (e.g., an element “having” A may also have B). Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”) or the alternatives are mutually exclusive (e.g., “one or more” should not be interpreted as “one and more”). Furthermore, although components, functions, actions, and instructions may be described or claimed in the singular, the plural is contemplated unless limitation to the singular is explicitly stated. Accordingly, as used herein, the articles “a,” “an,” “the,” and “said” are intended to include one or more of the stated elements. Additionally, as used herein, the terms “at least one” and “one or more” encompass “one” component, function, action, or instruction performing or capable of performing a described or claimed functionality and also “two or more” components, functions, actions, or instructions performing or capable of performing a described or claimed functionality in combination.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such.

What is claimed is:

1. An actuator driver, comprising:

a first digital adder configured to output an adjusted control signal based on combining an input control signal and a filtered difference signal;

a digital pulse width modulation (PWM) generator configured to convert the adjusted control signal to one or more PWM signals;

an H-bridge amplifier configured to output one or more driving signals based on the one or more PWM signals;

a feedback signal generator configured to generate a feedback signal based on the one or more driving signals;

a second digital adder configured to output a difference signal based on subtracting the feedback signal from the adjusted control signal; and a loop filter configured to generate the filtered difference signal based on the difference signal.

2. The actuator driver of claim 1, wherein:

the digital PWM generator is configured to have a first delay d1, the feedback signal generator is configured to have a second delay d2, and the actuator driver, based on at least the loop filter, the digital PWM generator, and the feedback signal generator, is configured to implement shaping of an error signal based on a noise transfer function (NTF) that has, in a z-transform domain, an expression of:

$$NTF(Y(z)/E(z))=(1-H(z))/(-H(z)+H(z)\cdot z\hat{}-(d1+d2)),$$

wherein:

Y(z) represents the one or more driving signals,

E(z) represents the error signal introduced to the one or more driving signals by the H-bridge amplifier, and H(z) represents a transfer function of the loop filter.

3. The actuator driver of claim 1, wherein:

the loop filter is based on a combination of multiple component filters.

4. The actuator driver of claim 3, wherein the loop filter is based on a combination of:

a first signal path based on a first component filter of the multiple component filters, and a second signal path based on cascading the first component filter and a second component filter of the multiple component filters.

5. The actuator driver of claim 1, wherein:

a bandwidth of the loop filter is adjustable based on a setting provided by a controller outside the actuator driver.

6. The actuator driver of claim 5, wherein:

a gain value of a transfer function of the loop filter is programmable based on the setting provided by the controller for adjusting the bandwidth of the loop filter.

7. The actuator driver of claim 5, wherein:

the input control signal is provided by the controller.

8. The actuator driver of claim 1, wherein the feedback signal generator comprises:

a voltage sensing circuit configured to generate a sensed voltage signal based on the one or more driving signals;

an analog-to-digital converter configured to generate a sensed digital signal based on the sensed voltage signal;

a decimation filter configured to generate a down-sampled digital signal based on the sensed digital signal; and a gain compensator configured to generate the feedback signal by scaling the down-sampled digital signal.

9. The actuator driver of claim 8, wherein:

the loop filter is configured to operate based on a first sampling rate; and the analog-to-digital converter is configured to operate based on a second sampling rate that is at least eight (8) times the first sampling rate.

10. The actuator driver of claim 8, wherein:

the one or more driving signals includes two driving signals, and the voltage sensing circuit comprises:

a differential amplifier configured to output an amplified signal based on the two driving signals, and an anti-aliasing filter configured to generate the sensed voltage signal by filtering the amplified signal.

11. The actuator driver of claim 8, wherein:

the analog-to-digital converter is an oversampling sigma-delta analog-to-digital converter.

12. The actuator driver of claim 11, wherein:

the decimation filter is an order-3 cascaded integrator-comb (CIC) filter.

13. The actuator driver of claim 1, wherein:

the input control signal has a fundamental frequency ranging from 100 Hz to 500 Hz.

14. A method of operating an actuator driver, comprising:

outputting, by a first digital adder of the actuator driver, an adjusted control signal based on combining an input control signal and a filtered difference signal;

converting, by a digital pulse width modulation (PWM) generator of the actuator driver, the adjusted control signal to one or more PWM signals;

outputting, by an H-bridge amplifier of the actuator driver, one or more driving signals based on the one or more PWM signals;

generating, by a feedback signal generator of the actuator driver, a feedback signal based on the one or more driving signals;

outputting, by a second digital adder of the actuator driver, a difference signal based on subtracting the feedback signal from the adjusted control signal; and generating, by a loop filter of the actuator driver, the filtered difference signal based on the difference signal.

15. The method of claim 14, wherein:

the digital PWM generator is configured to have a first delay d1, the feedback signal generator is configured to have a second delay d2, and the actuator driver, based on at least the loop filter, the digital PWM generator, and the feedback signal generator, is configured to implement shaping of an error signal based on a noise transfer function (NTF) that has, in a z-transform domain, an expression of:

$$NTF(Y(z)/E(z))=(1-H(z))/(-H(z)+H(z)\cdot z\hat{}-(d1+d2))$$

wherein:

Y(z) represents the one or more driving signals,

E(z) represents the error signal introduced to the one or more driving signals by the H-bridge amplifier, and H(z) represents a transfer function of the loop filter.

16. The method of claim 14, further comprising:

adjusting a bandwidth of the loop filter based on a setting provided by a controller outside the actuator driver.

17. An electronic device, comprising:

a controller;

a haptic actuator; and an actuator driver configured to drive the haptic actuator, the haptic actuator comprising:

a first digital adder configured to output an adjusted control signal based on combining an input control signal from the controller and a filtered difference signal;

a digital pulse width modulation (PWM) generator configured to convert the adjusted control signal to one or more PWM signals;

an H-bridge amplifier configured to output one or more driving signals to drive the haptic actuator based on the one or more PWM signals;

a feedback signal generator configured to generate a feedback signal based on the one or more driving signals;

a second digital adder configured to output a difference signal based on subtracting the feedback signal from the adjusted control signal; and a loop filter configured to generate the filtered difference signal based on the difference signal.

18. The electronic device of claim 17, wherein:

the digital PWM generator is configured to have a first delay d1, the feedback signal generator is configured to have a second delay d2, and the actuator driver, based on at least the loop filter, the digital PWM generator, and the feedback signal generator, is configured to implement shaping of an error signal based on a noise transfer function (NTF) that has, in a z-transform domain, an expression of:

$$NTF(Y(z)/E(z))=(1-H(z))/(-H(z)+H(z)\cdot z\hat{}-(d1+d2))$$

wherein:

Y(z) represents the one or more driving signals,

E(z) represents the error signal introduced to the one or more driving signals by the H-bridge amplifier, and H(z) represents a transfer function of the loop filter.

19. The electronic device of claim 17, wherein:

a bandwidth of the loop filter is adjustable based on a setting provided by the controller outside the actuator driver.

20. The electronic device of claim 17, wherein the electronic device comprises at least one of: a music player, a video player, an entertainment unit; a navigation device, a communications device, a mobile device, a mobile phone, a smartphone, a personal digital assistant, a fixed location terminal, a tablet computer, a computer, a wearable device, a laptop computer, a server, an internet of things (IoT) device, or a device in an automotive vehicle.

* * * * *